（12）United States Patent
Kim et al.

(10) Patent No.: US 12,389,097 B2
(45) Date of Patent: *Aug. 12, 2025

(54) CAMERA MODULE HAVING GYRO SENSOR AND CAMERA INCLUDING THE SAME

(71) Applicant: LG INNOTEK CO., LTD., Seoul (KR)

(72) Inventors: Tae Kyung Kim, Seoul (KR); Jung Hwan Bang, Seoul (KR); Young Bae Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,329

(22) Filed: Sep. 12, 2023

(65) Prior Publication Data

US 2023/0421876 A1  Dec. 28, 2023

Related U.S. Application Data

(63) Continuation of application No. 17/698,861, filed on Mar. 18, 2022, now Pat. No. 11,785,319, which is a (Continued)

(30) Foreign Application Priority Data

May 14, 2018 (KR) .......................... 10-2018-0054874

(51) Int. Cl.
*H04N 23/54* (2023.01)
*H04N 23/55* (2023.01)
*H04N 23/57* (2023.01)

(52) U.S. Cl.
CPC ............. *H04N 23/54* (2023.01); *H04N 23/55* (2023.01); *H04N 23/57* (2023.01)

(58) Field of Classification Search
CPC ........ H04N 23/54; H04N 23/55; H04N 23/57; H04N 23/6812; H04N 23/50; H04N 23/52; H04N 23/687; H04N 23/51
See application file for complete search history.

(56) References Cited

U.S. PATENT DOCUMENTS

| 8,396,357 B2 * | 3/2013 | Yanagisawa ............. G03B 5/02 348/208.7 |
| 8,866,919 B2 | 10/2014 | Ahn et al. |

(Continued)

FOREIGN PATENT DOCUMENTS

| CN | 102073191 A | 5/2011 |
| CN | 105190429 A | 12/2015 |

(Continued)

*Primary Examiner* — Padma Haliyur
(74) *Attorney, Agent, or Firm* — Birch, Stewart, Kolasch & Birch, LLP (57) ABSTRACT

A camera module includes a circuit board on which an image sensor is disposed, a lens unit disposed in front of a sensor surface of the image sensor, a housing accommodating the lens unit and the image sensor, disposed on the circuit board and a gyro sensor sensing the motion. The circuit board includes a first circuit board on which the image sensor is disposed, and a second circuit board on which the gyro sensor is disposed. The first circuit board may be disposed extending in a first axis direction, and the second circuit board may be disposed extending in a direction parallel to the optical axis direction while perpendicular to the first axis. The central axis of the gyro sensor may be parallel to the first axis direction but perpendicular to the optical axis direction.

20 Claims, 8 Drawing Sheets

Related U.S. Application Data continuation of application No. 17/055,384, filed as application No. PCT/KR2019/005556 on May 14, 2019, now Pat. No. 11,290,624.

(56) References Cited

U.S. PATENT DOCUMENTS

| | | |
|---|---|---|
| 9,804,408 B2 | 10/2017 | Rho et al. |
| 9,910,291 B2 | 3/2018 | Kim et al. |
| 10,197,887 B2 | 2/2019 | Enta |
| 11,290,624 B2 | 3/2022 | Kim et al. |
| 11,785,319 B2 | 10/2023 | Kim et al. |
| 2006/0208609 A1 | 9/2006 | Heim |
| 2007/0217775 A1 | 9/2007 | Shirono et al. |
| 2007/0297780 A1 | 12/2007 | Enomoto |
| 2011/0080515 A1 | 4/2011 | Kang |
| 2011/0122267 A1 | 5/2011 | Ahn et al. |
| 2011/0262121 A1* | 10/2011 | Yanagisawa ......... G02B 27/646 396/55 |
| 2012/0020654 A1 | 1/2012 | Yanagisawa et al. |
| 2015/0219878 A1 | 8/2015 | Kim |
| 2015/0229843 A1 | 8/2015 | Shimizu |
| 2016/0085086 A1 | 3/2016 | Rho et al. |
| 2017/0034442 A1* | 2/2017 | Kim ...................... H04N 23/55 |
| 2018/0109660 A1 | 4/2018 | Yoon et al. |
| 2019/0028620 A1* | 1/2019 | Park ....................... H04N 23/55 |
| 2019/0238728 A1 | 8/2019 | Hwang et al. |
| 2021/0218868 A1 | 7/2021 | Kim et al. |
| 2022/0210297 A1 | 6/2022 | Kim et al. |
| 2023/0421876 A1 | 12/2023 | Kim et al. |

FOREIGN PATENT DOCUMENTS

| | | |
|---|---|---|
| CN | 105446053 A | 3/2016 |
| CN | 205156907 U | 4/2016 |
| CN | 107615160 A | 1/2018 |
| CN | 112136313 A | 12/2020 |
| JP | 2014-10287 A | 1/2014 |
| KR | 10-2007-0074884 A | 7/2007 |
| KR | 10-2010-0028886 A | 3/2010 |
| KR | 10-0956226 B1 | 5/2010 |
| KR | 10-2010-0071038 A | 6/2010 |
| KR | 10-2011-0009779 A | 1/2011 |
| KR | 10-2012-0005704 A | 1/2012 |
| KR | 10-2012-0021636 A | 3/2012 |
| KR | 10-1245059 B1 | 3/2013 |
| KR | 10-2017-0089992 A | 8/2017 |
| KR | 10-2018-0049491 A | 5/2018 |

* cited by examiner

CAMERA MODULE HAVING GYRO SENSOR AND CAMERA INCLUDING THE SAME

CROSS REFERENCE TO RELATED APPLICATIONS

This application is a Continuation of U.S. application Ser. No. 17/698,861, filed Mar. 18, 2022, which is a Continuation of U.S. application Ser. No. 17/055,384, filed on Nov. 13, 2020 (now U.S. Pat. No. 11,290,624, issued on Mar. 29, 2022), which is the National Phase of PCT International Application No. PCT/KR2019/005556, filed on May 14, 2019, which claims priority under 35 U.S.C. 119(a) to Patent Application No. 10-2018-0054874, filed in the Republic of Korea on May 14, 2018, all of which are hereby expressly incorporated by reference into the present application.

TECHNICAL FIELD

The embodiment relates to a camera module and a camera including the same.

BACKGROUND ART

The camera module performs a function of photographing a subject and storing it as an image or video, and is mounted on a mobile terminal such as a mobile phone, a laptop computer, a drone, or a vehicle.

On the other hand, portable devices such as smartphones, tablet PCs, and laptops have micro-camera modules built-in, and these camera modules automatically can adjust the distance between the image sensor and the lens to align the focal length of the lens with an autofocus function.

Recently, a camera module may perform a zooming function of zooming up or zooming out of photographing by increasing or decreasing the magnification of a distant subject through a zoom lens.

In addition, recently, camera modules employ image stabilization (IS) technology to correct or prevent image shake due to unstable fixing devices or camera movement caused by user movement. These IS technologies include Optical Image Stabilizer (OIS) technology and anti-shake technology using an image sensor.

OIS technology is a technology that corrects motion by changing the path of light, and an anti-shake technology using an image sensor is a technology that corrects movement in a mechanical and electronic manner, and OIS technology is more widely adopted.

On the other hand, the image sensor has a higher resolution as it goes to a higher pixel, so that the size of the pixel decreases. However, as the pixel becomes smaller, the amount of light received at the same time decreases. Therefore, in a dark environment, the higher the pixel camera, the more severe the blurring of the image due to hand shake appears as the shutter speed becomes slower.

Accordingly, in order to capture an image without distortion using a high-pixel camera in a dark night or in a video, the OIS function has recently been essentially adopted.

On the other hand, OIS technology is a method of correcting the image quality by correcting the optical path by moving the lens or image sensor of the camera. In particular, the OIS technology detects the movement of the camera through a gyro sensor and can calculate the distance the image sensor needs to move.

For example, OIS correction methods include a lens shift method and a module tilting method. The lens movement method moves only the lens in the camera module to rearrange the center of the image sensor and the optical axis. On the other hand, the module tilting method moves the entire module including the lens and the image sensor.

In particular, the module tilting method has a wider correction range than the lens shift method, and since the focal length between the lens and the image sensor is fixed, there is an advantage of minimizing image deformation.

Meanwhile, in the case of the lens movement method, a Hall sensor is used to detect the position and movement of the lens. On the other hand, in the module tilting method, a photo reflector is used to detect the movement of the module. However, both methods use a gyro sensor to detect the movement of the camera user.

The OIS controller uses the data recognized by the gyro sensor to predict where the lens or module should move to compensate for the user's movement.

On the other hand, the conventional OIS technology has a complex structure because a mechanical driving device is required for lens movement or tilting of a module, and a driving device or a gyro sensor must be mounted, so there is a limitation in implementing a micro camera module.

DISCLOSURE

Technical Problem

The embodiment is to provide a micro-camera module.

In addition, the embodiment is to provide a camera module capable of providing a micro camera module while securing high precision of the gyro sensor by securing a high flatness of the gyro sensor.

In addition, in relation to the arrangement of the gyro sensor of the camera module, the gyro sensor 260 is disposed close to the camera module to improve the accuracy of the angular acceleration, and at the same time, the accuracy of the gyro sensor is unfamiliar with the error rate due to temperature drift. It is intended to provide a camera module having a complex technical effect that can significantly improve and provide a micro camera module.

In addition, according to the embodiment, in addition to the shielding effect of the shield can 210, it is intended to provide a camera module having a complex technical effect of shielding EMI, EMC, etc. by the support bracket 262.

The technical problem of the embodiment is not limited to the content described in this item, and includes what is understood from the description of the invention.

Technical Solution

The camera module according to the embodiment includes a circuit board 230 on which the image sensor 240 is disposed, a lens unit 220 disposed in front of a sensor surface of the image sensor 240, the lens unit 220, and a housing 225 for accommodating the image sensor 240 and a gyro sensor 260 disposed on the circuit board 230 to detect movement.

The circuit board 230 includes a first circuit board 231 on which the image sensor 240 is disposed, and a second circuit board 232 on which the gyro sensor 260 is disposed, and the first circuit board 231 may be extended and disposed in the first axis direction, and the second circuit board 232 may be disposed to extend in a direction parallel to the optical axis direction while perpendicular to the first axis.

The central axis of the gyro sensor 260 may be parallel to the first axis direction but perpendicular to the optical axis direction.

The embodiment may further include a shield can 210 on the outer surface of the housing 225.

The shield can 210 may include a predetermined support bracket 262 and may include a guide groove 262R in which the second circuit board 232 is disposed in the support bracket 262.

As the second circuit board 232 is fixedly disposed in the guide groove 262R of the support bracket 262, the flatness of the gyro sensor 260 can be secured within 1°.

In another embodiment, the shield can 210 may include one or more guide protrusions 210P.

The guide protrusion 210P may be disposed to be parallel to the second axial direction and extending in a direction perpendicular to the first axial direction.

The second circuit board 232 may be fixedly disposed on the guide protrusion 210P.

As the second circuit board 232 is fixedly disposed on the guide protrusion 210P, the flatness of the gyro sensor 260 may be secured within 1°.

Advantageous Effects

The embodiment can provide a micro camera module. For example, according to the embodiment, the gyro sensor 260 is disposed on the second circuit board 232 disposed perpendicular to the horizontal coordinate axis (x-axis) direction and extending in a parallel direction to the optical axis (z-axis) direction. Accordingly, by controlling the size of the camera module to the level of the parallel width of the housing 225, there is a technical effect of implementing a micro camera module.

For example, in the embodiment, in the conventional internal technology, an area of about 3 to 4 mm or more (about 25% or more) of a circuit board area in which the gyro sensor was disposed may be reduced by extending in the horizontal coordinate axis (x axis) direction. Accordingly, there is a technical effect that can provide a micro camera module.

In addition, according to the embodiment, as the second circuit board 232 is firmly fixed and disposed in the guide groove 262R of the support bracket 262, the flatness of the gyro sensor 260 is secured, thereby increasing the precision of the gyro sensor. There is a complex technical effect that can provide a micro camera module while securing it.

For example, in the camera module of the embodiment, a support bracket 262 is provided in the shield can 210, and the support bracket 262 includes a guide groove 262R in which the second circuit board 232 is disposed. As the second circuit board 232 is firmly fixed and disposed in the guide groove 262R of the bracket 262, it is possible to provide a micro-camera module with a special technical effect that can secure a high flatness of the gyro sensor 260.

In addition, in relation to the arrangement of the gyro sensor of the camera module, the gyro sensor 260 is arranged close to the camera module to improve the accuracy of angular acceleration and at the same time, the accuracy of the gyro sensor is significantly improved by fading the error rate due to temperature drift. In addition, there is a complex technical effect that can provide a micro camera module.

For example, as in the embodiment, the support bracket 262 is provided on the shield can 210, and the support bracket 262 includes a guide groove 262R in which the second circuit board 232 is disposed. As the second circuit board 232 is firmly fixed and disposed in the guide groove 262R of support bracket 262, the gyro sensor 260 is placed close to the camera module to improve the accuracy of angular acceleration and generate a lot of heat. By disposing it away from the image sensor 240, there is a complex technical effect that can provide a micro camera module while significantly improving the accuracy of the gyro sensor by making the error rate due to temperature drift unfamiliar.

In addition, according to the embodiment, in addition to the shielding effect of the shield can 210, there is a complex technical effect of shielding EMI, EMC, etc. by the support bracket 262.

Next, according to another embodiment, in the camera module of the embodiment, the shield can 210 includes a guide protrusion 210P, and the second circuit board 232 is rigidly fixed to the guide protrusion 210P. In addition to the special technical effect of ensuring a high flatness of the sensor 260, there is a special technical effect of providing a microminiature camera module.

In addition, according to another embodiment, the shield can 210 may include a guide protrusion 210P. The second circuit board 232 may be firmly fixedly disposed on the guide protrusion 210P. Accordingly, the gyro sensor 260 is disposed close to the camera module to improve the accuracy of angular acceleration, and at the same time, the gyro sensor 260 is disposed away from the image sensor 240 that generates a lot of heat, thereby reducing the error rate due to temperature drift. Accordingly, the embodiment has a complex technical effect capable of providing a micro camera module while remarkably improving the precision of the gyro sensor.

The technical effect of the embodiment is not limited to the content described in this item, and includes what is understood from the description of the invention.

MODE FOR INVENTION

Hereinafter, embodiments will be described in detail with reference to the accompanying drawings. Since the embodiments can be modified in various ways and have various forms, specific embodiments will be illustrated in the drawings and described in detail in the text. However, this is not intended to limit the embodiments to a specific type of disclosure, it should be understood that all changes, equivalents, and substitutes included in the spirit and scope of the embodiments are included.

Terms such as "first" and "second" may be used to describe various elements, but the elements should not be limited by the terms. These terms are used for the purpose of distinguishing one component from another component. In addition, terms specifically defined in consideration of the configuration and operation of the embodiment are only for describing the embodiment, and do not limit the scope of the embodiment.

In the description of the embodiment, in the case of being described as being formed on "upper" or "under" of each element, it includes both elements in direct contact with each other or in which one or more other elements are indirectly formed between the two elements. In addition, when expressed as "up" or "under", the meaning of not only an upward direction but also a downward direction based on one element may be included.

In addition, relational terms such as "up/upper/top" and "down/lower/bottom" used below do not necessarily require or imply any physical or logical relationship or order between such entities or elements, it may be used to distinguish one entity or element from another entity or element.

First Embodiment

Figure 1:
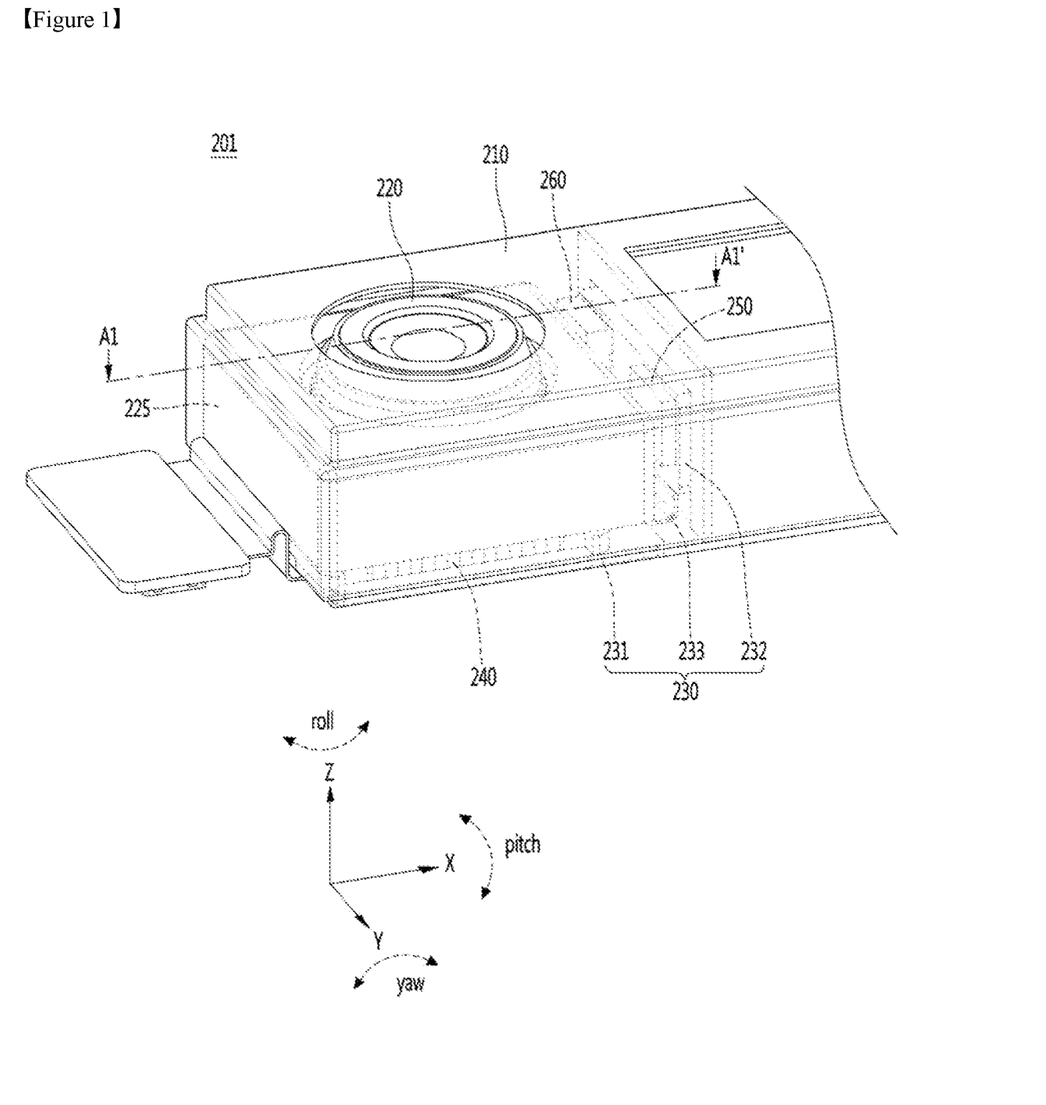
FIG. 1 is a perspective view showing the camera module of the first embodiment.
Figure 2:
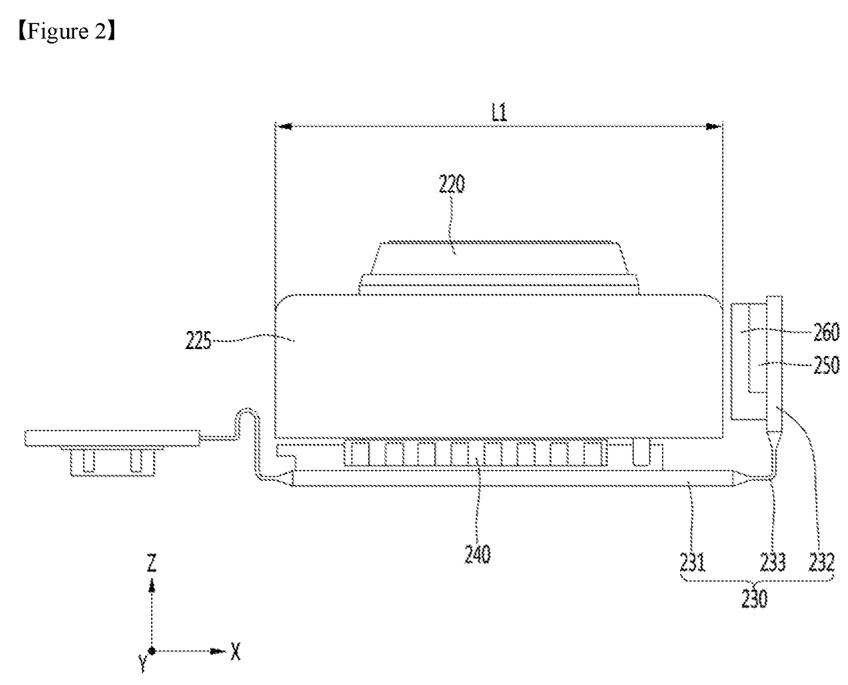
FIG. 2 is a partial side view of the camera module according to the first embodiment shown in FIG. 1.
Figure 3:
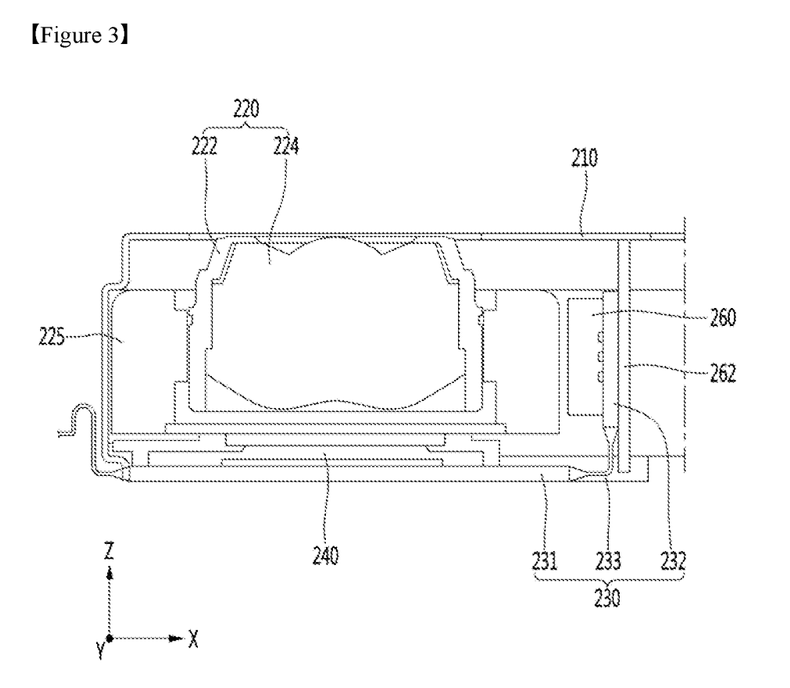
FIG. 3 is a partial cross-sectional view taken along line A1-A1' of the camera module according to the first embodiment shown in FIG. 1.
Figure 4:
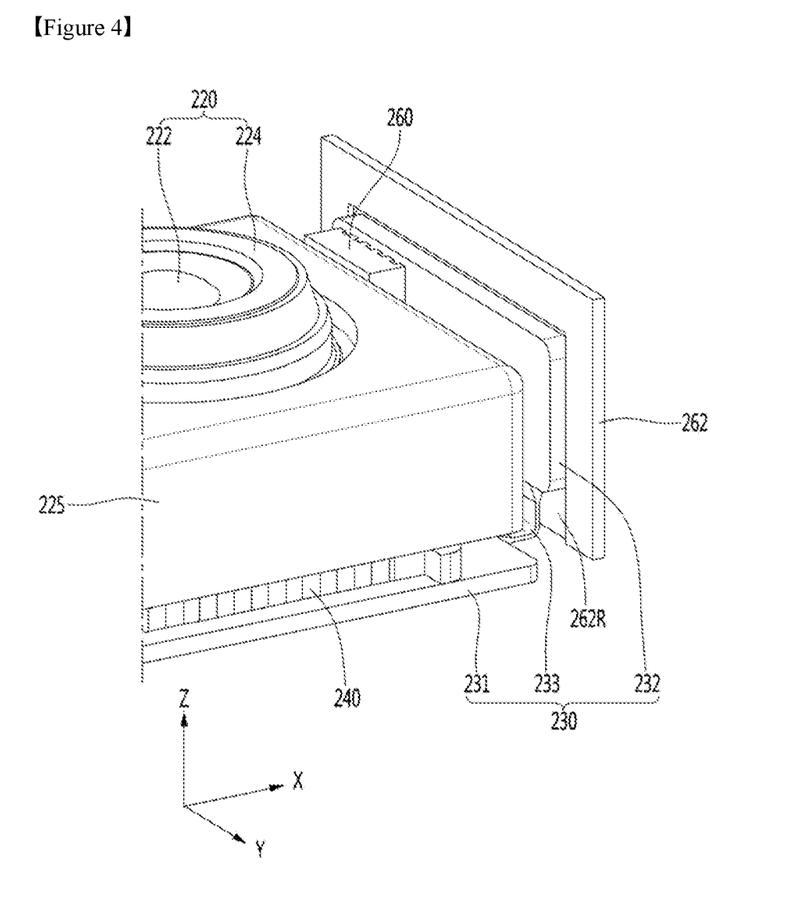
FIG. 4 is a partial perspective view of the camera module according to the first embodiment shown in FIG. 1.

FIG. 1 is a perspective view showing a camera module 201 according to a first embodiment. In addition, FIG. 2 is a partial side view of the camera module 201 according to the first embodiment shown in FIG. 1, and FIG. 3 is a partial cross-sectional view along the line A1-A1' of the camera module 201 according to the first embodiment shown in FIG. 1. And FIG. 4 is a partial perspective view of the camera module 201 according to the first embodiment shown in FIG. 1.

In an embodiment, a direction parallel to the optical axis of light may be referred to as the z-axis, and a plane perpendicular to the optical axis may be the xy plane, and in the xy plane, the x-axis and y-axis may be defined as mutually perpendicular directions, but is not limited to thereto. In this case, the x-axis may be defined as a horizontal coordinate axis and the y-axis may be defined as a vertical coordinate axis, but the present invention is not limited thereto.

First, referring to FIG. 1, the camera module 201 of the embodiment includes a circuit board 230 on which an image sensor 240 is disposed, a lens unit 220 disposed in front of a sensor surface of the image sensor 240, and a housing 225 accommodating the lens unit 220 and the image sensor 240.

In addition, the camera module 201 according to the embodiment includes a gyro sensor 260 disposed on the circuit board 230 to detect movement and a driving circuit element 250 for controlling an actuator (not shown) that drives the lens unit 220 according to input/output signals from the gyro sensor 260.

The circuit board 230 includes a first circuit board 231 on which the image sensor 240 is disposed, a second circuit board 232 on which the gyro sensor 260 and the driving circuit element 250 are disposed, and a connection board 233 connecting the first circuit board 231 and the second circuit board 232.

In addition, referring to FIG. 1, in the camera module 201 of the embodiment, a shield can 210 may be additionally installed on the outer surface of the housing 225. The shield can 210 may also be referred to as a cover housing. The shield can 210 may be formed of a metal material such as steel (SUS), and may shield electromagnetic waves flowing into and out of the camera module, and may also prevent the inflow of foreign substances into the camera module.

Next, in the camera module 201 of the embodiment, the image sensor 240 receives a solid-state image sensor such as a CMOS (Complementary Metal Oxide Semiconductor Image Sensor) or a CCD (Charge Coupled Device), and an analog electrical signal output from the solid-state image sensor. It may include an analog-to-digital converter converting and outputting a digital value.

FIG. 2 is a partial side view of the camera module 201 according to the first embodiment shown in FIG. 1, and FIG. 3 is a partial cross-sectional view along line A1-A1' of the camera module 201 according to the first embodiment shown in FIG. 1. The embodiment will be described with reference to FIGS. 2 and 3.

Referring to FIG. 3, in the embodiment, the lens unit 220 may be equipped with a predetermined barrel 222 and a lens 224. The lens 224 may include a single lens or a plurality of lenses.

In an embodiment, an actuator (not shown) capable of driving the lens unit 220 may be disposed on the housing 225. The actuator may be a voice coil motor, a micro actuator, a silicon actuator, or the like, and may be applied in various ways such as an electrostatic method, a thermal method, a bimorph method, and an electrostatic force method, but is not limited thereto.

For example, the actuator of the embodiment may support one or a plurality of lenses 224 and perform an auto focusing function by moving the lenses 224 up and down in response to a control signal from a predetermined controller. In addition, the lens 224 may be moved left or right to perform a camera shake correction function. In addition, the lens 224 may be moved up, down, left and right to perform an autofocusing function and a camera shake correction function.

Referring back to FIG. 1, according to the embodiment, by employing a gyro sensor 260, an OIS technology for correcting image quality may be implemented by detecting a movement of a camera module and correcting an optical path by moving a lens.

The movement of the camera module may largely include a linear movement that moves along an axis and a rotational movement that rotates about the axis.

First, as shown in FIG. 1, the linear movement is a movement in the horizontal coordinate axis (x-axis) direction of the camera module, a movement in the vertical coordinate axis (y-axis) direction of the camera module, and a movement in the (z-axis) direction along an optical axis arranged in the front and rear directions of the camera module.

Next, as shown in FIG. 1, the rotational movement includes a pitch, which means a vertical rotational movement using the horizontal coordinate axis (x-axis) of the camera module as a rotational axis. In addition, the rotational movement includes a yaw, which means a left-right rotational movement with the vertical coordinate axis (y-axis) of the camera module as a rotation axis. In addition, the rotational movement may include a roll that means a rotational movement using an optical axis (z axis) passing in the front and rear direction of the camera module as a rotation axis.

In an embodiment, the gyro sensor 260 may employ a two-axis gyro sensor that detects two rotational amounts of a pitch and a yaw representing a large movement in a two-dimensional image frame, and more accurate hand shake. Also, for accurate correction, a three-axis gyro sensor that detects all the amount of movement of the pitch, yaw and roll may be employed. Movements corresponding to the pitch, yaw, and roll detected by the gyro sensor 260 may be converted into an appropriate physical quantity according to a camera shake correction method and a correction direction.

Next, FIG. 4 is a partial perspective view of the camera module 201 according to the first embodiment shown in FIG. 1.

In an embodiment, the circuit board 230 may include a first circuit board 231 on which the image sensor 240 is disposed, and a second circuit board 232 on which the gyro sensor 260 is disposed. The circuit board 230 may include a connection board 233 connecting the first circuit board 231 and the second circuit board 232, and the second circuit board 232 includes a driving circuit element 250 disposed thereon, but is not limited thereto.

In the embodiment, the circuit board 230 is any board having a wiring pattern that can be electrically connected, such as a rigid printed circuit board (Rigid PCB), a flexible printed circuit board (Flexible PCB), and a rigid flexible printed circuit board (Rigid Flexible PCB). Can include.

For example, the first circuit board 231 and the second circuit board 232 may be rigid printed circuit boards (Rigid PCB), and the connection board 233 may be a flexible printed circuit board (Flexible PCB) or a Rigid Flexible PCB, but is not limited thereto.

In an embodiment, the first circuit board 231 may be extended and disposed in the horizontal coordinate axis (x-axis) direction of the camera module, and the second circuit board 232 is vertical to the horizontal coordinate axis (x-axis) direction. It may be disposed to extend in a direction parallel to the optical axis (z-axis) direction.

Through this, according to the embodiment, since the gyro sensor 260 is disposed on the second circuit board 232, there is a technical effect of implementing a micro camera module.

For example, in the unpublished internal technology, the length of the circuit board 230 in the horizontal coordinate axis (x-axis) direction of the camera module occupies about 15 mm, so there is a problem to implement a micro camera module.

By the way, as shown in FIG. 2, the gyro sensor 260 is disposed on the second circuit board 232 which is perpendicular to the horizontal coordinate axis (x-axis) direction and extends in a parallel direction to the optical axis (z-axis) direction. By controlling the size of the module to the level of the parallel width L1 of the housing 225, there is a technical effect of implementing a micro camera module.

For example, the embodiment may reduce an area of about 3 to 4 mm or more (about 25% or more) of a circuit board area extending in the horizontal coordinate axis (x-axis) direction in order to arrange a gyro sensor in the conventional internal technology. Accordingly, the embodiment has a technical effect of implementing a micro camera module.

According to an embodiment, the gyro sensor 260 is disposed on the second circuit board 232 disposed perpendicular to the horizontal coordinate axis (x axis) direction and extending in a parallel direction to the optical axis (z axis) direction. According to the arrangement, the central axis of the gyro sensor 260 may be parallel in the horizontal coordinate axis (x-axis) direction but perpendicular to the optical axis (z-axis) direction.

Accordingly, in the embodiment, in the measurement data of the gyro sensor 260, the pitch movement may be replaced with a roll and the roll movement may be controlled with a pitch.

Referring back to FIG. 4, in the camera module of the embodiment, a support bracket 262 is provided in the shield can 210, and a guide groove 262R in which the second circuit board 232 is disposed is formed in the support bracket 262.

Accordingly, since the second circuit board 232 is firmly fixedly disposed in the guide groove 262R of the support bracket 262, the flatness of the gyro sensor 260 can be secured high. For example, as in the embodiment, as the second circuit board 232 is firmly fixed and disposed in the guide groove 262R of the support bracket 262, the flatness of the gyro sensor 260 is very precise and can be secured within about 1°.

In the prior art, no attempt has been made to arrange the center of the gyro sensor in a direction perpendicular to the optical axis direction. In particular, in the gyro sensor, since flatness is important for the accuracy of the data, there is no attempt to arrange the center of the gyro sensor in a vertical direction not horizontal to the optical axis direction.

However, in the camera module of the embodiment, the support bracket 262 is provided in the shield can 210, and the support bracket 262 includes a guide groove 262R in which the second circuit board 232 is disposed. As the second circuit board 232 is firmly fixed and disposed in the guide groove 262R of the support bracket 262, there is a special technical effect in that a micro-camera module can be provided with a special technical effect that can secure a high flatness of the gyro sensor 260. The guide groove 262R may be referred to as a recess, but is not limited thereto.

In addition, regarding the arrangement of the gyro sensor of the camera module, there is a problem that the angular acceleration error probability increases as the gyro sensor is farther from the camera module, and there is a technical contradiction that the error rate due to temperature drift increases as the gyro sensor is closer.

However, as in the embodiment, the support bracket 262 is provided in the shield can 210, and the support bracket 262 includes a guide groove 262R in which the second circuit board 232 is disposed in the support bracket 262. As the second circuit board 232 is firmly fixedly disposed in the guide groove 262R, the gyro sensor 260 is placed close to the camera module to improve the precision of angular acceleration and at the same time generate a lot of heat. By dislocating it away from image sensor 240, there is a complex technical effect that can provide a very compact camera module while remarkably improving the accuracy of the gyro sensor by making the error rate due to temperature drift unfamiliar.

In addition, according to the embodiment, in addition to the shielding effect of the shield can 210, there is also a complex technical effect of shielding EMI, EMC, etc. by the support bracket 262.

Second Embodiment

Figure 5:
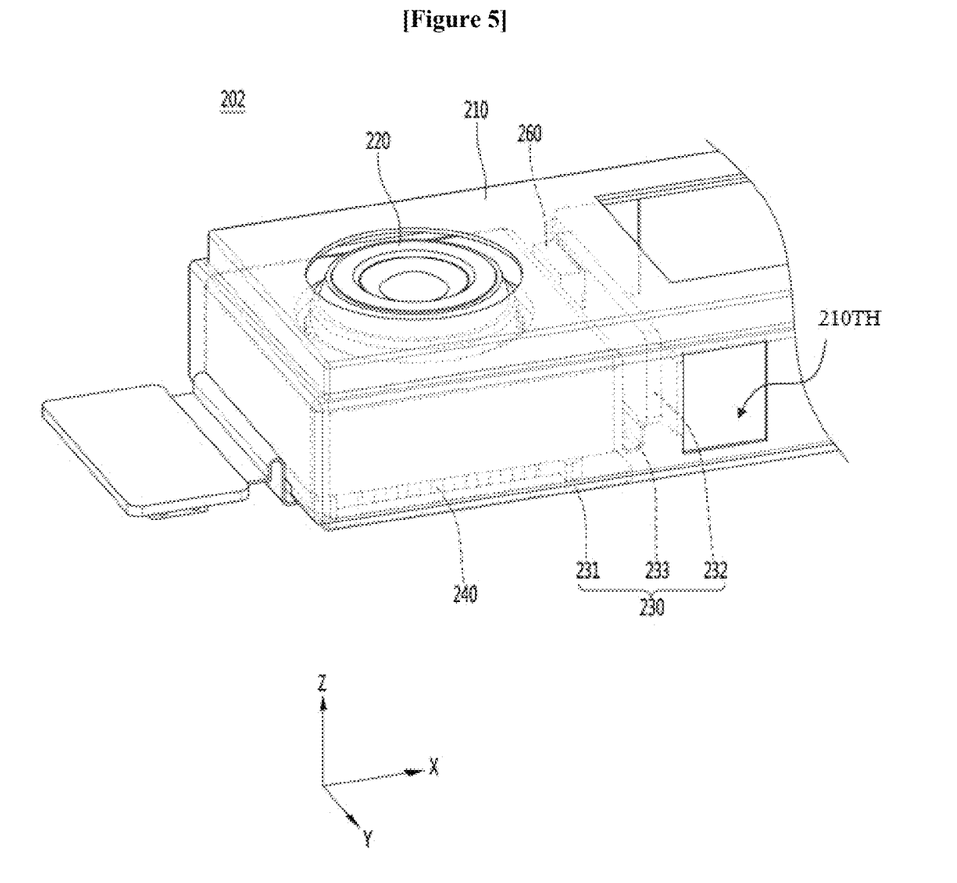
FIG. 5 is a perspective view showing a camera module according to a second embodiment.
Figure 6:
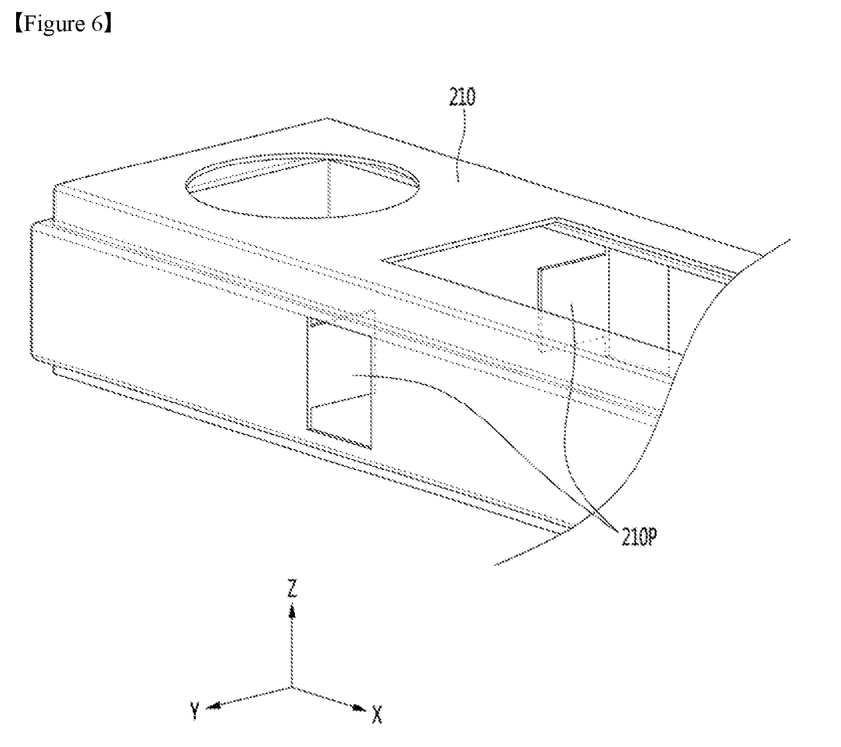
FIG. 6 is a partial perspective view of a shield can of the camera module according to the second embodiment shown in FIG. 5.
Figure 7:
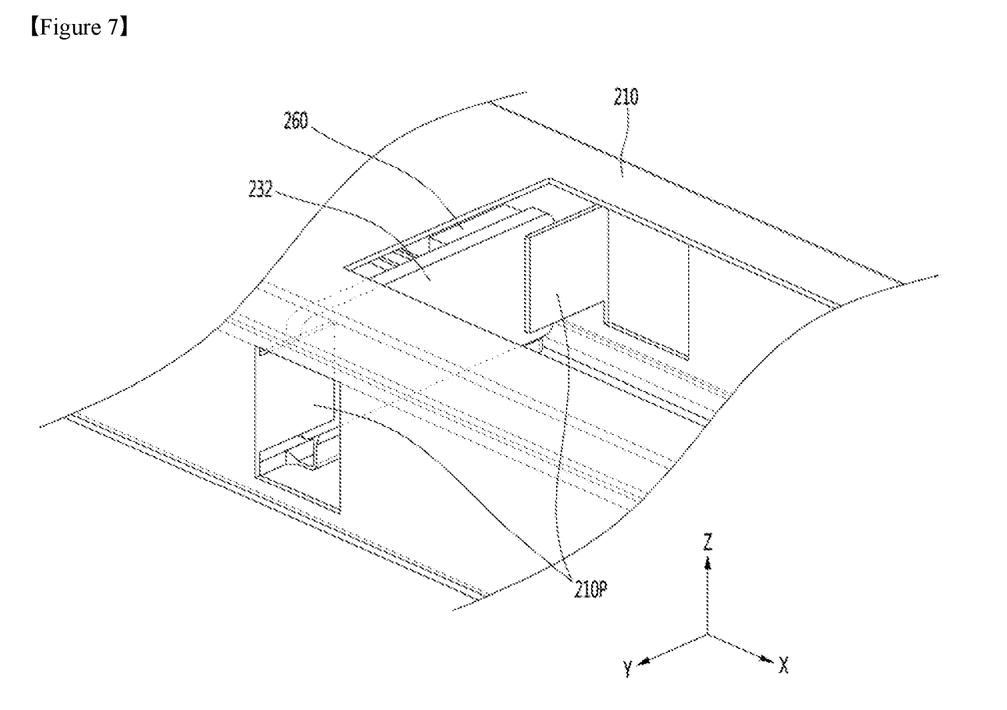
FIG. 7 is a partial perspective view of the camera module according to the second embodiment shown in FIG. 5.
Figure 8:
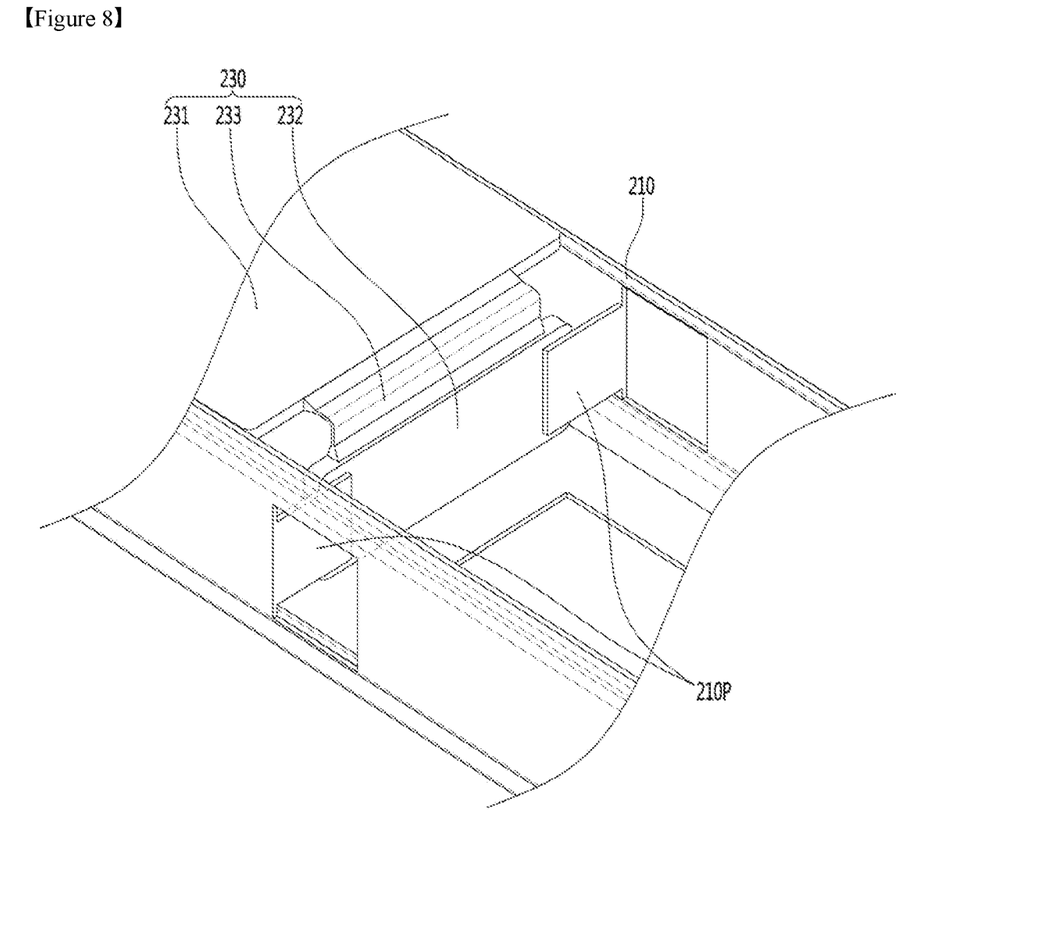
FIG. 8 is a rear perspective view of the camera module according to the second embodiment shown in FIG. 6.

FIG. 5 is a perspective view showing the camera module 202 of the second embodiment. FIG. 6 is a partial perspective view of the shield can 210 of the camera module 202 of the second embodiment shown in FIG. 5, and FIG. 7 is a partial perspective view of the camera module 202 of the second embodiment shown in FIG. 5, FIG. 8 is a rear perspective view of the camera module 202 of the second embodiment shown in FIG. 6.

The second embodiment may adopt the technical features of the first embodiment, and the main features of the second embodiment will be described below.

Referring to FIG. 5, the camera module 202 of the second embodiment includes a circuit board 230 on which an image sensor 240 is disposed, and a lens unit 220 disposed in front of a sensor surface of the image sensor 240 and a housing 225 for accommodating the lens unit 220 and the image sensor 240. A side wall of the shield can 210 includes a through-hole 210TH.

In addition, the camera module 202 according to the second embodiment may include a driving circuit element 250 for controlling an actuator (not shown) which controls the lens unit 220 according to an input/output signal of the gyro sensor 260 and the gyro sensor 260 disposed on the circuit board 230 to detect movement.

The circuit board 230 includes a first circuit board 231 on which the image sensor 240 is disposed, a second circuit board 232 on which the gyro sensor 260 and the driving circuit element 250 are disposed, and a connection board 233 connecting the first circuit board 231 and the second circuit board 232.

In this case, referring to FIG. 5, in the camera module 202 of the second embodiment, a shield can 210 may be installed on an outer surface of the housing 225. The shield can 210 may also be referred to as a cover housing. The shield can 210 may be formed of a metal material such as steel (SUS), and may shield electromagnetic waves flowing into and out of the camera module, and may also prevent the inflow of foreign substances into the camera module.

FIG. 6 is a partial perspective view of the shield can 210 of the camera module 202 of the second embodiment shown in FIG. 5.

Referring to FIG. 6, the shield can 210 of the camera module 202 of the second embodiment may include one or more guide protrusions 210P.

The guide protrusion 210P may be disposed to be parallel to the vertical coordinate axis (y-axis) direction and extend in a direction perpendicular to the horizontal coordinate axis (x-axis) direction.

The guide protrusion 210P may be formed of the same material as or similar to the material of the shield can 210, but is not limited thereto.

Next, FIG. 7 is a partial perspective view of the camera module 202 of the second embodiment shown in FIG. 5, and FIG. 8 is a rear perspective view of the camera module 202 of the second embodiment shown in FIG. 6.

Referring to FIG. 5 for a moment, in the second embodiment, the circuit board 230 includes a first circuit board 231 on which an image sensor 240 is disposed, and a second circuit board 232 on which a gyro sensor 260 is disposed. The circuit board 230 may include a connection board 233 connecting the first circuit board 231 and the second circuit board 232, and the second circuit board 232 includes a driving circuit element (Not shown) may be disposed, but is not limited thereto.

In an embodiment, the first circuit board 231 may be extended and disposed in the horizontal coordinate axis (x-axis) direction of the camera module, and the second circuit board 232 is vertical to the horizontal coordinate axis (x-axis) direction and may be disposed to extend in a direction parallel to the optical axis (z-axis) direction.

Through this, according to the embodiment, since the gyro sensor 260 is disposed on the second circuit board 232, there is a technical effect of implementing a micro camera module.

For example, as described above, in the unpublished internal technology, as the length of the circuit board 230 in the horizontal coordinate axis (x-axis) direction of the camera module occupies about 15 mm, there is a problem to implement a micro camera module.

However, as shown in FIG. 5, the gyro sensor 260 is disposed on the second circuit board 232 disposed perpendicular to the horizontal coordinate axis (x-axis) direction and extending in a parallel direction to the optical axis (z-axis) direction. By controlling the size of the module to the level of the parallel width of the housing 225, there is a technical effect of implementing a micro camera module.

For example, the embodiment may reduce an area of about 3 to 4 mm or more (about 25% or more) of a circuit board area extending in the horizontal coordinate axis (x-axis) direction in order to arrange a gyro sensor in the conventional internal technology. Accordingly, the embodiment has a technical effect of implementing a micro camera module.

Referring back to FIGS. 7 and 8, the shield can 210 may include one or more guide protrusions 210P in the camera module according to the second embodiment. The guide protrusion 210P may be disposed to be parallel to the vertical coordinate axis (y-axis) direction and extend in a direction perpendicular to the horizontal coordinate axis (x-axis) direction.

Accordingly, since the second circuit board 232 is firmly fixedly disposed on the guide protrusion 210P, a high flatness of the gyro sensor 260 may be secured. For example, as the second circuit board 232 is rigidly fixed to the guide protrusion 210P as in the embodiment, the flatness of the gyro sensor 260 can be very precisely secured within about 1°.

On the other hand, in the gyro sensor, since flatness is important in the accuracy of the data, in the prior art, an attempt has not been made to arrange the center of the gyro sensor in a direction perpendicular to the direction of the optical axis rather than parallel.

However, in the camera module of the embodiment, the shield can 210 may have a guide protrusion 210P, and the second circuit board 232 may be rigidly fixedly disposed on the guide protrusion 210P. Through this, there is a special technical effect that can secure a high flatness of the gyro sensor 260 and a special technical effect that can provide a micro-miniature camera module.

In addition, as described above, in relation to the arrangement of the gyro sensor of the camera module, there is a problem that the angular acceleration error probability increases as the gyro sensor is further away from the camera module. On the other hand, as the gyro sensor is closer to the camera module, there is a technical contradiction in which the error rate due to temperature drift increases.

By the way, as the shield can 210 of the second embodiment has a guide protrusion 210P, and the second circuit board 232 is rigidly fixed to the guide protrusion 210P and the second circuit board 232 can be rigidly fixed and disposed in the guide protrusion 210P. Accordingly, the gyro sensor 260 is disposed close to the camera module to improve the accuracy of the angular acceleration, and at the same time, the gyro sensor 260 is disposed away from the image sensor 240 that generates a lot of heat, so that an error rate due to temperature drift can be blocked. Therefore, the embodiment has a complex technical effect capable of providing a very compact camera module while remarkably improving the precision of the gyro sensor.

Features, structures, effects, and the like described in the above embodiments are included in at least one embodiment, and are not necessarily limited to only one embodiment. Furthermore, the features, structures, effects, and the like illustrated in each embodiment can be implemented by combining or modifying other embodiments by a person having ordinary knowledge in the field to which the embodiments belong. Therefore, contents related to such combinations and modifications should be interpreted as being included in the scope of the embodiments.

Although the embodiments have been described above, these are only examples and are not intended to limit the embodiments, and those of ordinary skill in the field to which the embodiments belong are not departing from the essential characteristics of the embodiments. It will be seen that branch transformation and application are possible. For example, each component specifically shown in the embodiment can be modified and implemented. And differences related to these modifications and applications should be construed as being included in the scope of the embodiments set in the appended claims.

INDUSTRIAL APPLICABILITY

The camera module according to the embodiment may be used in a mobile terminal such as a mobile phone, a laptop computer, a drone, or a vehicle.

The invention claimed is:

1. A camera module comprising:
a first circuit board extending in a first direction;
an image sensor disposed on the first circuit board;
a housing disposed on the image sensor and having a lens unit;
a shield can including a side wall covering a side surface of the housing;
a second circuit board extending in a second direction perpendicular to the first direction and parallel to an optical axis direction and electrically connected to the first circuit board;
a gyro sensor disposed on the second circuit board to detect movement; and
a support bracket disposed spaced apart from the side wall of the shield can,
wherein the gyro sensor and the second circuit board are located between the housing and the support bracket.

2. The camera module according to claim 1, wherein the side wall of the shield can is configured to overlap the gyro sensor in a third direction perpendicular to the first direction and the second direction.

3. The camera module according to claim 2, wherein the side wall of the shield can is configured to overlap the support bracket in the third direction.

4. The camera module according to claim 1, wherein the gyro sensor is configured to overlap the second circuit board and the support bracket.

5. The camera module according to claim 1, wherein the gyro sensor is configured to overlap the second circuit board and the support bracket in a third direction perpendicular to the first and second directions.

6. The camera module according to claim 1, wherein the gyro sensor is configured to overlap the support bracket in a third direction perpendicular to the first and second directions.

7. The camera module according to claim 1, wherein the second circuit board is configured to overlap the support bracket in a third direction perpendicular to the first and second directions.

8. The camera module according to claim 1, wherein a center of the gyro sensor is horizontal to the first direction and is perpendicular to the optical axis direction.

9. The camera module according to claim 1, wherein the side wall of the shield can comprises a through-hole.

10. The camera module according to claim 1, wherein a horizontal width of the support bracket is greater than a horizontal width of the second circuit board, the camera module.

11. A camera module comprising:
a first circuit board extending in a first direction;
an image sensor disposed on the first circuit board;
a housing disposed on the image sensor and having a lens unit;
a shield can including a side wall covering a side surface of the housing;
a second circuit board extending in a second direction perpendicular to the first direction and parallel to an optical axis direction and electrically connected to the first circuit board;
a gyro sensor disposed on the second circuit board to detect movement; and
a support bracket disposed spaced apart from the side wall of the shield can,
wherein the gyro sensor and the second circuit board are located between the housing and the side wall of the shield can.

12. The camera module according to claim 11, wherein the gyro sensor is disposed between the housing and the support bracket.

13. The camera module according to claim 11, wherein the side wall of the shield can is configured to overlap the gyro sensor in a third direction perpendicular to the first direction and the second direction.

14. The camera module according to claim 11, wherein the gyro sensor is configured to overlap the second circuit board and the support bracket.

15. The camera module according to claim 11, wherein the gyro sensor is configured to overlap the support bracket in a third direction perpendicular to the first and second directions.

16. The camera module according to claim 11, wherein the second circuit board is configured to overlap the support bracket in a third direction perpendicular to the first and second directions.

17. The camera module according to claim 11, wherein a center of the gyro sensor is horizontal to the first direction and is perpendicular to the optical axis direction.

18. The camera module according to claim 11, wherein the side wall of the shield can includes a through-hole.

19. The camera module according to claim 11, wherein a horizontal width of the support bracket is greater than a horizontal width of the second circuit board.

20. The camera module according to claim 11, wherein the second circuit board is disposed between the housing and the support bracket.

* * * * *